United States Patent [19]

Payne et al.

[11] 3,792,472

[45] Feb. 12, 1974

[54] WARNING INDICATOR TO ALERT AIRCRAFT PILOT TO PRESENCE AND BEARING OF OTHER AIRCRAFT

[75] Inventors: Delmar V. Payne, Ferndale; Wilfried G. Jaeckle, Birmingham, both of Mich.

[73] Assignee: The Bendix Corporation, Southfield, Mich.

[22] Filed: Aug. 14, 1972

[21] Appl. No.: 280,308

[52] U.S. Cl. ............. 343/6.5 LC, 343/112 CA
[51] Int. Cl. ............................................. G01s 9/56
[58] Field of Search ...... 343/6.5 R, 6.5 LC, 112 CA

[56] References Cited
UNITED STATES PATENTS

| | | | |
|---|---|---|---|
| 3,089,139 | 5/1963 | Hovannesian et al. | 343/112 CA |
| 3,412,402 | 11/1968 | Beckwith | 343/112 CA |
| 2,427,191 | 9/1947 | Brink | 343/6.8 R |
| 3,040,314 | 6/1962 | Hesse | 343/112 CA |
| 3,114,145 | 12/1963 | Vielle et al. | 343/6.5 R |
| 3,035,260 | 5/1962 | Freedman et al. | 343/6.5 R |

Primary Examiner—Malcolm F. Hubler

[57] ABSTRACT

A pilot warning indicator which operates in cooperation with the ATCRBS to produce an indication of the presence and bearing of other aircraft at substantially the same altitude as the equipped craft. A spiral-phase field antenna array together with a digital phase comparator utilizes transponder reply signals from other aircraft to ground interrogations to provide bearing indications. Amplitude comparisons are made between transponder reply signals received by omnidirectional antennas mounted on the top and bottom of the aircraft fuselage to eliminate warnings of aircraft flying at substantially different altitude than equipped craft.

20 Claims, 7 Drawing Figures

RIGHT-REAR QUADRANT
LEFT-FRONT QUADRANT - - - -

| φ | U₁ | U₂ | U₃ | U₄ |
|---|---|---|---|---|
| 0°- 22½° | 1 | 1 | 0 | 0 |
| 22½°- 67½° | 1 | 1 | 1 | 0 |
| 67½°- 112½° | 1 | 1 | 1 | 1 |
| 112½°- 157½° | 0 | 1 | 1 | 1 |
| 157½°- 202½° | 0 | 0 | 1 | 1 |
| 202½°- 247½° | 0 | 0 | 0 | 1 |
| 247½°- 292½° | 0 | 0 | 0 | 0 |
| 292½°- 337½° | 1 | 0 | 0 | 0 |
| 337½°- 0° | 1 | 1 | 0 | 0 |

WARNING INDICATOR TO ALERT AIRCRAFT PILOT TO PRESENCE AND BEARING OF OTHER AIRCRAFT

The present invention relates to Pilot Warning Indicators for aircraft. More particularly, it relates to a system for indicating to an aircraft pilot the presence and approximate bearing of one or more other aircraft which may present collision hazards.

The need for protecting aircraft against mid-air collisions is obvious. Catastrophic losses in life and property and projected increases in such losses from heavier traffic have for several decades stimulated efforts by government agencies, industry associations and individuals to conceive and develop effective means for preventing aircraft collisions. The earliest means to come into practice were visual aids to aircraft recognition such as distinctive paint markings, running lights and more recently high intensity strobe lamps. Then airways and traffic patterns together with ground control of aircraft were established and continuously improved. More accurate and numerous navigational aids contribute to flight safety but despite these all, errors by pilot or ground controller or equipment failures still lead to numerous near misses between aircraft and to the rare tragic collision.

Where disaster has been avoided, it has been due to alert timely maneuver by one or both threatened pilots who successfully evaluate the hazard and change course to avoid it. But greater aircraft speeds and decreasing maneuverability more and more lessen the chance of avoiding a collision where visual sighting is the mode of protection. Advanced efforts have therefore been directed to perfecting a system capable of detecting a hazardous situation and directing an appropriate escape maneuver early enough that combined pilot reaction and aircraft inertia delays will not prevent successful execution. These systems have become known as Collision Avoidance Systems (CAS).

The Collision Avoidance Systems showing greatest promise of perfection are of the cooperative type wherein every aircraft is to be equipped with special radio transmitters and receivers enabling the exchange of signals between all aircraft within a particular area to provide identification, range, bearing, altitude or other significant information whereby threats of collision can be automatically evaluated. The system then determines the most effective maneuver for one or both imperiled aircraft to perform and signals the appropriate action to the pilot in due time to permit its execution.

As might be expected CAS is costly, putting the system out of reach of most light aircraft owners. But it is the light aircraft, frequently ill equipped with navigational aids and operated by inexperienced pilots, which present more numerous hazards and which are more likely to be involved in collisions, either amongst themselves or with heavy aircraft.

It has been shown that the probability of collision can be reduced below that of random encounter if one or both pilots of two aircraft in a dangerous situation has sighted the other. Graham and Orr, in an article entitled "Separation of Traffic by Visual Means" (Proc. IEEE, March, 1970, p. 359) make the following statements:

"Both the probability of seeing and the probability of avoiding decrease with increasing closing speed, yet the data indicate that a PWI system which was completely effective in enabling the pilot to visually detect the other aircraft would reduce the number of expected collisions by a large factor, even at higher speeds.

In the overtaking geometry, with the assumption that only the pilot of the overtaking aircraft acted, a reduction in midair collisions by a factor of 50 is possible. At the lower closing speeds in a not overtaking geometry an ideal PWI would reduce midair collisions by a factor of 600. This factor falls off with increasing closing speed to 120 in the 500 knot closing speed interval."

What has been quantitatively established to some degree of accuracy by Graham and Orr has for some time been intuitively recognized. Efforts to devise an effective PWI system predate the present invention. Probably one of the first systems proposed and the one most frequently reinvented comprised a limited range radio transmitter on the one aircraft and a receiver on the other aircraft adapted to give an alarm when the receiver came within range of the transmitter. The prime short coming of such a system is that it gives rise to an excessive number of false alarms. For example, the transmitter range might be five miles and yet an alarm would be given when two aircraft were crossing in level flight but at altitudes separated by that distance.

One improvement in ths early system comprised means for tuning both transmitter and receiver as a function of altitude, thus decreasing the number of alarms to those representing aircraft at substantially equal altitudes which are potential hazards. To be most effective, however, a PWI system should assist the pilot in sighting the other aircraft so that an evaluation of the collision threat can be made at the earliest possible time. A further improvement was therefore provided by adding direction finding means to indicate the approximate relative bearing of another, potentially hazardous aircraft.

Such an improved PWI system possibly could approach the ideal system conjectured by Graham and Orr but it bears the striking disadvantage that preferably all, and practically, nearly all, aircraft must carry standardized special purpose cooperating equipment before any reasonable degree of protection exists.

In recent years in the United States the Air Traffic Control Radar Beacon System (ATCRBS) has played an increasingly important role in air traffic control and safety. The system comprises a ground based interrogating radar and transponders mounted aboard aircraft which automatically respond to ground interrogations with signals indicating either the identity of the aircraft or its altitude, according to the nature of the interrogation. The system helps prevent confusion of radar targets by a ground controller and enables the more effective use of computers to relieve the heavy burden of the ground controller. The Federal Aviation Administration has prohibited entry in certain airspaces to aircraft not equipped with transponders and has otherwise encouraged their general use. Industry has responded by marketing at reasonable prices a variety of transponders suited to aircraft of various classes. The projection is therefore that soon most aircraft, both light and heavy, will be equipped with transponders for the ATCRBS.

It has been heretofore proposed that use be made of ATCRBS transponder reply signals as a data source for a PWI system. Several advantages are inherent in this proposal. It would make use of existing transponder equipment in a way that would not interfere with the primary function of the transponder, thus eliminating a special PWI transmitter and reducing the cost of the PWI system, stimulating its wider use. Reply signals from airborne transponders occur at a standard frequency of 1,090 MHz, permitting ready separation from ground interrogation signals, which are transmitted at 1,030 MHz, and from other radio signals. Further, false alarms created by reflected signals should be fewer for ultra high frequency signals than for lower frequency signals and atmospheric conditions such as fog and rain would not noticeably degrade performance of the PWI system.

Desirable characteristics of a PWI system, whatever the type, have been identified as including a range of 5-6 miles, response through 360° in azimuth but limited to ±10° about the pitch plane of the aircraft and providing a bearing indication to the other aircraft accurate within ±15°.

It is the primary object of the present invention to provide a PWI system operating in cooperation with the ATCRBS capable of meeting all of these identified desirable characteristics.

More specifically, it is an object of the invention to provide a PWI system capable of alerting an aircraft pilot to the presence and bearings of other aircraft flying substantially at his own altitude.

Another object of the invention is to provide a PWI system substantially free of false alarms.

A further object is to provide a PWI system operating in conjunction with the ATCRBS in which information of the bearing of other aircraft is obtained by digitally processing phase data of reply signals by the other aircraft to ground interrogations.

Another object is to provide a PWI system which discriminates between other aircraft at different altitudes by amplitude comparison of reply signals received by antennas mounted on the PWI equipped aircraft so as to be shielded from one another for certain aspects of the aircraft.

Still another object is to provide a PWI system operating in cooperation with the ATCRBS in quasi-synchronism therewith to insure detection and warning of other aircraft near the PWI equipped craft.

Other objects and advantages of the invention will become evident as an understanding of its construction and operation is gained through studying the following detailed description and drawings.

Briefly, the invention comprises a PWI having a receiver tuned to the frequency of the ATCRBS reply signals. Signals are furnished to the receiver by a directive antenna array and a phase reference antenna whence the receiver provides an indication of the bearing of possibly hazardous aircraft. Before such indications are produced, however, the receiver performs an amplitude comparison operation between signals received by a non-directional antenna mounted on top of the aircraft and those received by a non-directional antenna mounted on the bottom of the aircraft, thus discriminating against signals from aircraft substantially above or below the altitude of the aircraft equipped with PWI. Timing circuits are included to insure that the PWI equipment does not interfere with operation of the ATCRBS transponder aboard the equipped aircraft and to provide assurance that the PWI operational cycle is so coordinated with the ground based radar that replies will be detected from other aircraft being interrogated simultaneously with the PWI equipped craft. Digital circuits are used for phase comparison and logic operations to provide virtually instantaneous direction finding and to reduce interference by noise.

Figure 1:
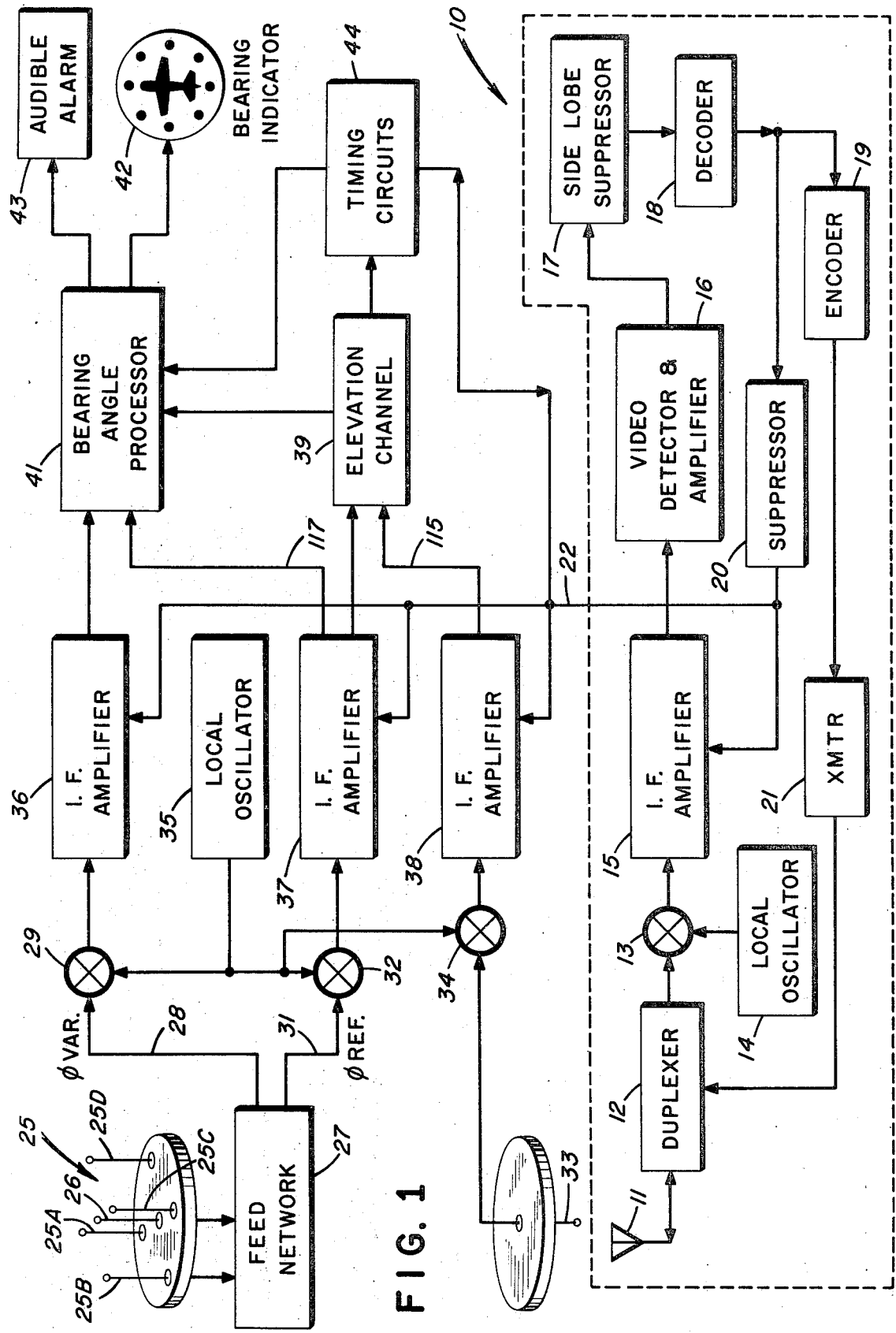
FIG 1 is a functional block diagram broadly illustrating the invention together with an ATCRBS transponder of known design.

In FIG. 1, the conventional ATCRBS transponder is shown generally within block 10. Signals from a ground based interrogating radar are received by an omnidirectional antenna 11, passed through a duplexer 12, mixer 13 operating with a local oscillator 14, an IF amplifier 15, finally to appear as video pulses at the output of a detector 16. These pulses are tested by known means to determine whether they originated in the main beam or the side lobes of the ground radar. If the interrogation was by side lobe radiation, a suppressor circuit 17 is actuated which prevents a reply from the transponder. If the interrogation is a valid main beam interrogation, the pulses are passed to a decoder 18 which determines which mode, i.e. identity or altitude, of reply is sought by the ground station and actuates an encoder 19 which formulates the appropriate information as a train of pulses. Output from the encoder modulates a transmitter 21 connected to antenna 11 through duplexer 12 to radiate the reply. Output from the decoder also actuates a suppressor circuit 20 to inhibit processing further interrogation signals during the reply and, through line 22, to inhibit operation of other equipment aboard the aircraft, such as the DME, which might interfere with the reply.

Transponders of the sort just described are the source of signals used by the PWI of this invention to detect the presence and location of other aircraft. Standards established for the ATCRBS, in addition to specifying an interrogation frequency of 1,030 MHz and a reply frequency of 1,090 MHz, also define the interrogation signal as comprising three 0.8 microseconds pulses spaced a maximum of 25 microseconds between first and third pulses. The reply signal consists of two framing pulses spaced 20.3 microseconds apart and interspersed by as many as 12 information pulses. The reply pulses are nominally 0.5 microseconds in duration. The interrogation rate is not to exceed 450 interrogations per second, a value consistent with approximately 200 miles maximum range for the interrogating radar, and the beamwidth of the interrogating radar is normally about 4°. The ground interrogator normally scans at a rate of 1/10 revolution per second, thus each aircraft should generate about 50 replies to the ground interrogator once every 10 seconds. Ordinarily, the aircraft will be under surveillance by several ground radars so that rate of generation of reply signals is the minimum to be expected.

Reply signals from other aircraft in the vicinity of the PWI equipped craft are received by an antenna array 25 comprising four monopole antennas spaced at 90° intervals about a circle preferably one wavelength of the operating frequency in the circumference. A single monopole antenna 26 is located at the center of the array 25 to provide a phase reference signal for determination of the bearing of the source of reply signals, as will later appear more fully. Signals from the array 25 are combined in a particular manner by a feed network 27 and appear as one input on line 28 to a mixer 29. Signals from the center antenna 26 pass directly through feed network 27 and are supplied by line 31 to another mixer 32. The array 25 and center antenna 26 are preferably mounted on the top side of the aircraft fuselage. Another monopole antenna 33 is mounted on the bottom side of the fuselage and furnishes signal to a third mixer 34. All three mixers 29, 32 and 34 are fed by a single local oscillator 35 to produce three coherent intermediate frequency signals as inputs to IF amplifiers 36, 37 and 38. The phase of signal from IF amplifier 36 is related to the phase of signal from IF amplifier 37 nearly directly in accordance with the azimuth bearing angle of the signal source from the array 25. The signals from IF amplifier 37 and IF amplifier 38 vary in amplitude according to the elevation angle of the signal source from the pitch plane of the aircraft, since the aircraft structure shields the top monopole 26 from the bottom monopole 33 causing signals received from a source located above the aircraft to appear in greater strength at antenna 26 than at antenna 33. If the source is located below the aircraft, the signal is stronger at antenna 33. Ideally, zero difference exists between the amplitudes of the output of amplifiers 37 and 38 for a source located on the pitch plane of the aircraft. Assuming level flight, the source would then be at the same altitude as the PWI equipped aircraft and represent a potential collision hazard. To afford some margin of protection against aircraft at approximately the same altitude and to allow for signal differences at different aspects of the aircraft, the amplitude comparison conducted in elevation channel 39 is so arranged as to pass an enabling signal to a bearing angle processor 41 only when the difference between logarithms of amplitudes of amplifier 37 and 38 signals is within specified limits. Upon its enablement the bearing angle processor 41 compares the phase of signal from amplifier 36 with that from amplifier 37 and actuates an indicator lamp in a bearing indicator 42 corresponding to a sector in which the source is located. Simultaneously, an audible alarm 43 is actuated to cause the pilot to direct his attention to the indicator and then to scan the sector of the sky in the direction indicated.

Since the PWI cannot function while the transponder 10 on the same aircraft is in operation it is necessary to detect such transponder operation and to periodically interrupt it to permit the PWI to operate. After a certain number of replies have been made by the transponder 10, as indicated by suppression pulses appearing on line 22, timing circuits 44 operate to suppress for a time replies by the transponder, during which time replies from other transponders are received by the PWI. The timing circuits coordinate the PWI with the ground interrogator by causing interruption of transponder 10 only after a specified number of transponder replies have been generated. This insures that the PWI will be in an active state and able to detect aircraft in the same beam or near enough thereto that both the PWI equipped craft and the other craft are interrogated at substantially the same time. The timing circuits are also arranged to require a specified number of coincident bearing determinations to be obtained before such a bearing is displayed by the indicator 42, thus reducing false alarms by noise pulses. The timing circuits are further operative to control the timing during which the warning will be displayed by indicator 42. The PWI will now be described in greater detail with attention first being directed to the antenna array 25.

Figure 2:
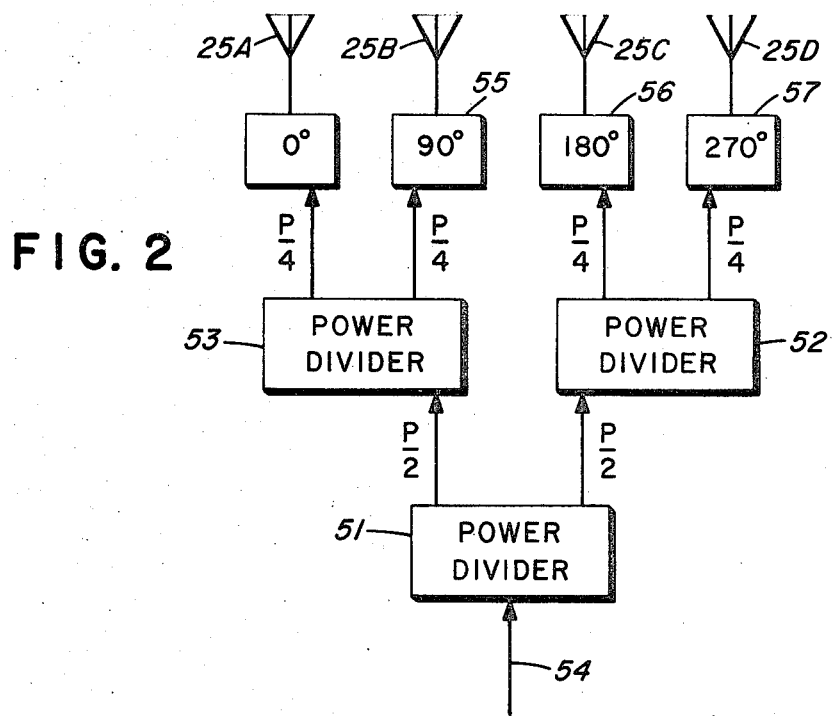
FIG. 2 is a functional block diagram of one form of feed network for the antenna used in the invention.

Array 25 comprises four monopole antennas 25a, 25b, 25c and 25d, equally spaced about a circle preferably one wavelength of the operating frequency in circumference, although other dimensions for the periphery of the array can be successfully employed. Referring to FIG. 2, feed network 27 may suitably comprise power dividers 51, 52 and 53 connected so that power applied to output line 54 will be equally divided between antennas 25a–25d and, by reciprocity, power received by the antennas will contribute equally to output on line 54. Antenna 25a is fed directly from one output of power divider 53 while antenna 25b is fed from power divider 53 through a phase shifter 55 which introduces a 90° phase shift with respect to antenna 25a. Antennas 25c and 25d are fed from power divider 52 through phase shifters 56 and 57 which respectively introduce phase shifts of 180° and 270° with respect to antenna 25a. Phase shifters 55, 56 and 57 may comprise transmission lines having lengths respectively exceeding the length of line feeding antenna 25a by $\lambda/4$, $\lambda/2$ and $3\lambda/4$.

Array 25 together with feed network 27 are known in the art as a spiral-phase field array. Such an array produces a far field E, proportional to $$E = \frac{E_o}{r} f(\theta) \epsilon^{j\left(\omega t - \frac{2\pi r}{\lambda}\right)} \left[ \sin\left(\frac{\pi d}{\lambda} \cos \Phi\right) + j \sin\left(\frac{\pi d}{\lambda} \sin \Phi\right) \right]$$

Equation (1)

Where:
$f(\theta)$ is the elevation pattern of the array and
$r$ is the distance of the field point from the array center.
$\Phi$ is the azimuth angle of the field point measured clockwise from an axis drawn through antennas 25b and 26.
$d$ is the diameter of the array.
$E_o$ is an amplitude factor independent of $\theta$, $\Phi$ and $r$.

From equation (1) the amplitude $|E|$ of a signal received by the array and appearing at the output 54 can be found to be proportional to $$|E| = \sqrt{\sin^2(\pi d/\lambda \cos \Phi) + \sin^2(\pi d/\lambda \sin \Phi)}$$

(2)

Also the phase difference $\phi$ between the signal appearing at output 54 and the signal from antenna 26 may be found from equation (1) as $$\phi = \tan^{-1} \frac{\sin\left(\frac{\pi d}{\lambda} \sin \Phi\right)}{\sin\left(\frac{\pi d}{\lambda} \cos \Phi\right)}; \text{ Phase Error, } \epsilon = \phi - \Phi$$

Equation (3)  Equation (3A)

Figure 3:
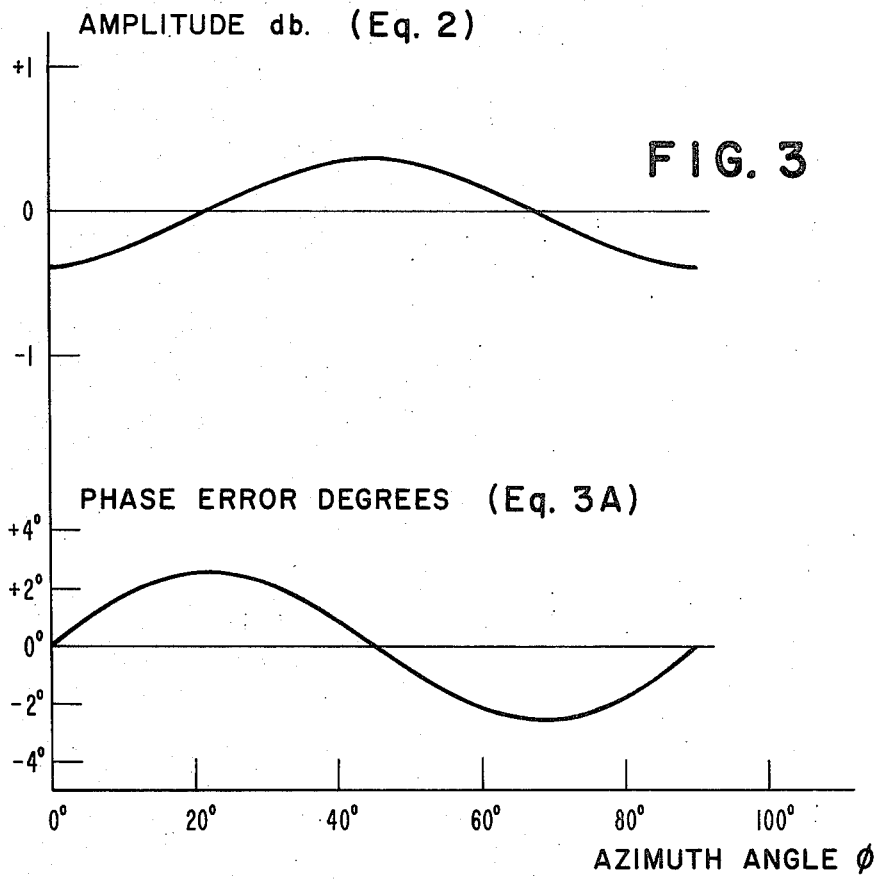
FIG. 3 is a chart showing the phase and amplitude relationship of signal output from the antenna array to the azimuth angle of a signal source.

Equations (2) and (3A) are plotted in FIG. 3 through 90° azimuth angle for an array having a diameter, $d$, equal to $\lambda/\pi$. The values of these functions for the remaining 270° of azimuth are repetitive of the plotted values. FIG. 3 illustrates that theoretically the amplitude of signal does not vary by more than 0.8 db as the source moves completely around the array nor does the error of measurement of phase difference exceed ±2.5°. Therefore the electrical phase measured between the signal from the array output and the signal from the reference antenna provides an indication of the azimuth bearing of the source from the array accurate to within 2.5°. As might be expected the errors measured for a prototype array are somewhat in excess of the theoretical maximum error but they are sufficiently small to provide full utility of the array in a PWI system.

Figures 4, 5A:
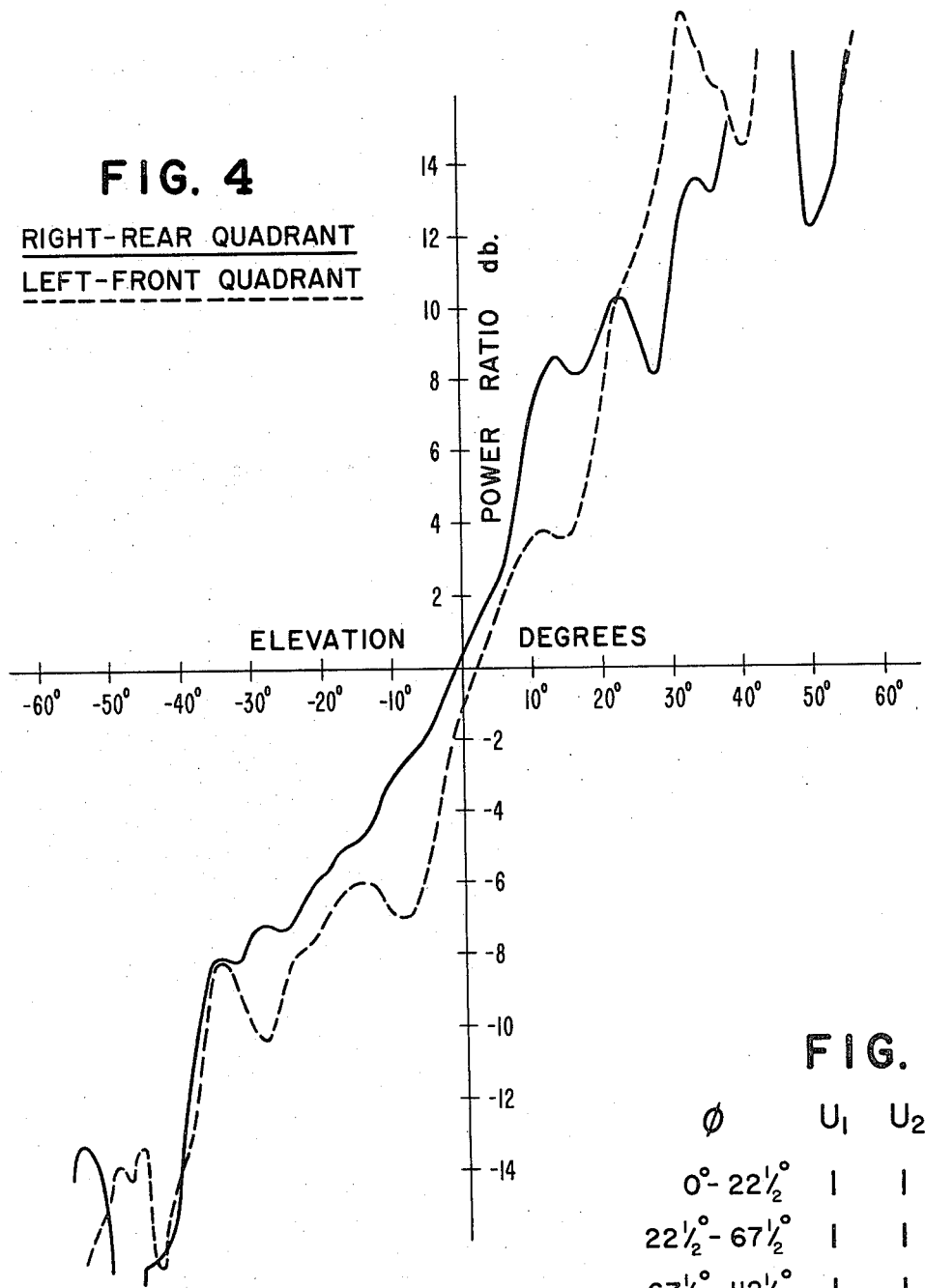
FIG. 4 is a chart showing the power ratio between signals received by omni-directional antennas mounted on the top and bottom of a particular aircraft fuselage for different elevation angles at two different aspects.
FIG. 5a is a truth table applicable to FIG. 5.

The difference between amplitudes of signals from antennas 26 and 33, used for altitude discrimination in elevation channel 39 is not readily obtained theoretically. FIG. 4 is a chart plotting the difference of logarithms of signals measured between the top mounted antenna 26 and bottom mounted antenna 33 for a particular aircraft for sources located to the right-rear and left-front of the aircraft. Since this power ratio is a function of the aircraft configuration, the data of FIG. 4 cannot be generalized to obtain a single limit for power ratio applicable to all aircraft. In this case, however, it will be seen that if limits are imposed upon the power ratio so that the signal amplitudes from top and bottom antennas must be within ±3 db power ratio before the bearing angle processor 41 is enabled by the elevation channel 39, then sources located in excess of about +6° and −10° elevation will not be indicated on the PWI indicator 42 for sources in the right-rear quadrant.

Figure 5:
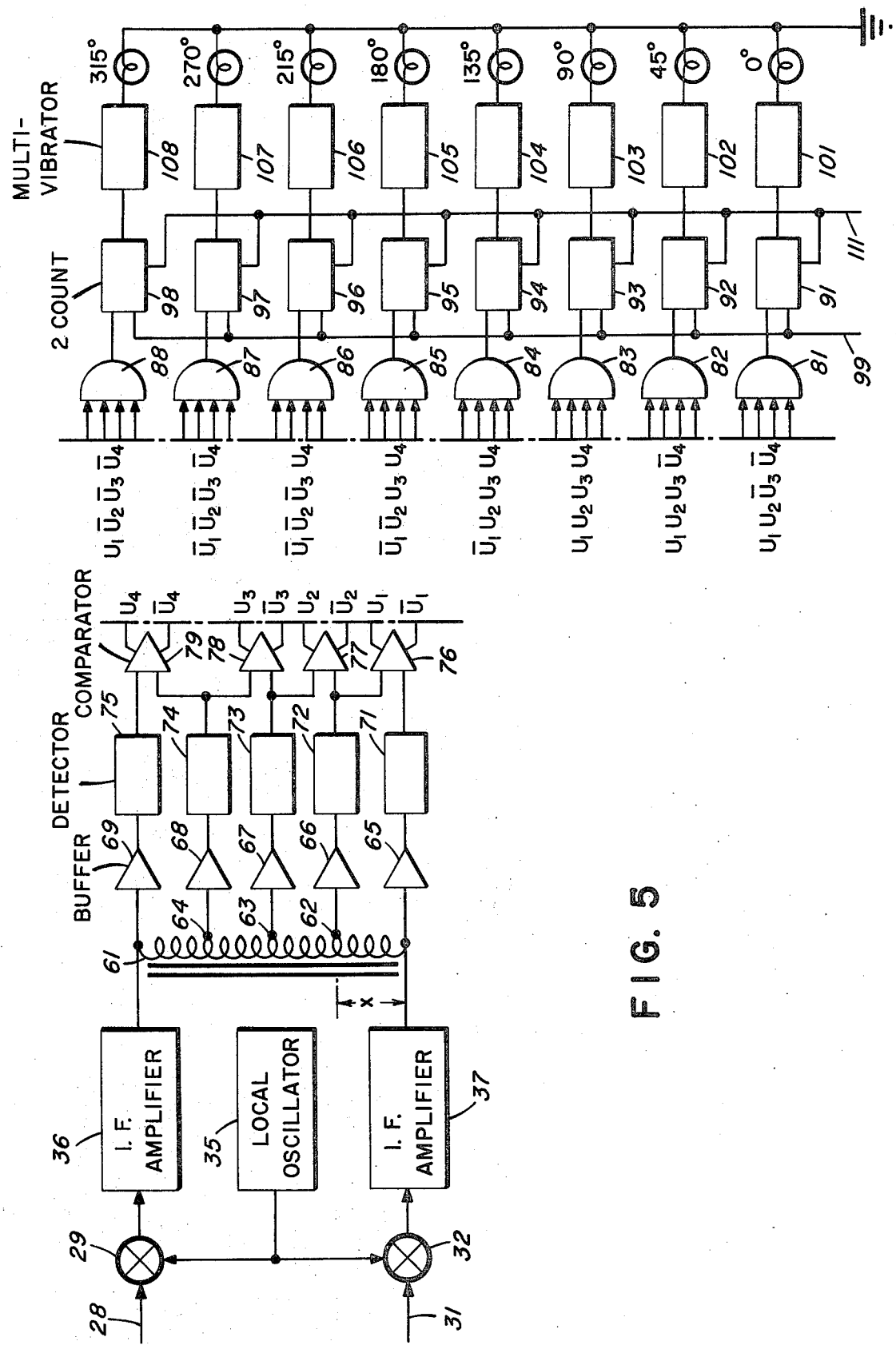
FIG. 5 is a functional block diagram illustrating in greater detail the bearing angle processor 41 of FIG. 1.

The bearing angle processor 41 is shown in greater detail in the block diagram of FIG. 5. Phase comparison of the signal from antenna array 25 with signal from the phase reference antenna 26 is accomplished digitally by applying the outputs of IF amplifiers 36 and 37 to opposite ends of a taped delay line 61. Delay line 61 is preferably $\lambda/4$ in length with taps 62, 63, 64 spaced equally along its length to provide four segments each having a delay of $\lambda/16$. Buffers 65-69, each of which is followed by a detector 71-75, are connected to each of the taps 62-64 and the ends of delay line 61. Voltage comparators 76-79 each having a pair of inputs from two adjacent ones of detectors 71-75 produce four digital outputs $U_1$, $U_2$, $U_3$ and $U_4$ and the complements thereof, $\overline{U}_1$, $\overline{U}_2$, $\overline{U}_3$ and $\overline{U}_4$. If the output voltage of detector 72 is of greater magnitude than that of detector 71, the output condition of comparator 76 is $U_1 = 1$ (High) and $\overline{U}_1 = 0$ Low. Similarly, if the magnitude of output from detector 73 is greater than that from detector 72 the condition of comparator 77 is $U_2 = 1$ and $\overline{U}_2 = 0$. Similar conditions are produced in comparators 78 and 79 whenever the output magnitude of detector 74 is greater than that of detector 73 and whenever the output magnitude of detector 75 is greater than that of detector 74. If the output magnitudes of detectors 71-75 are reversed from the order just stated, the outputs of comparators 76-79 will be complemented. For example if the magnitude of output from detector 71 is greater than that of detector 72 the output condition of comparator 76 is $U_1 = 0$ and $\overline{U}_1 = 1$.

The operation of this structure in producing digitized phase information is best explained mathematically as follows:

$$E_1 = A \epsilon^{j\omega t} \quad (4)$$

$$E_2 = B \epsilon^{j(\omega t - \phi)} \quad (5)$$

where $E_1$ is the output of amplifier 36 having amplitude A,
$E_2$ is the output of amplifier 37 having amplitude B,
$\omega = 2\pi f$ and $f$ is the frequency of signals from amplifiers 36 and 37, and
$\phi$ is the phase angle, in radians, of the signal from the array 25 relative to the phase of reference antenna 26.

The signals $E_1$ and $E_2$ combine in delay line 61 to produce at the tap located $x$ distance from the end of the delay line connected to amplifier 37 a voltage $E_x$ proportional to $$E_x = \left\{ E_1 \epsilon^{-jkx} + E_2 \epsilon^{-jk\left(\frac{\lambda}{4}-x\right)} \right\} \epsilon^{j\omega t}$$

$$= \left\{ A\epsilon^{-jkx} + B\epsilon\left[-jk\left(\frac{\lambda}{4}-x\right)-j\phi\right] \right\} \epsilon^{j\omega t}$$

where $$k = \frac{2\pi}{\lambda}. \quad \text{Equation (6)}$$

Assuming detectors 71-75 operate with square law characteristics and noting that $|E_x|^2 = E_x E_x^*$, where the superscript * symbolizes complex conjugate, the square law detected voltage $V_x$ is $$V_x = |E_x|^2 = A^2 + B^2 + 2 AB \cos k \lambda/4 - 2 kx + \phi) \quad (7)$$

Substituting for $k$ and letting $x = n \lambda/16$, where $n = 0, 1, 2, 3, 4$, the difference in amplitude of outputs at tap $n$ and at tap $n - 1$ is $$D_n = V_n - V_{(n-1)} = 4 AB \sin \pi/8 \cos[\phi - (2n-1)\pi/8] \quad (8)$$

The operation of comparators 76-79 in digitizing the detector outputs can be expressed by the following transform:

$$U_n = \begin{cases} 1 \text{ if } D_n > 0 \\ 0 \text{ if } D_n \leq 0 \end{cases} \text{ for } n=1, 2, 3, 4$$

Equation (9)

From equations (8) and (9) it follows that:

$$U_n = \begin{cases} 1 \text{ if } \cos\left[\phi - \frac{(2n-1)\pi}{8}\right] > 0; n=1, 2, 3, 4 \\ 0 \text{ otherwise} \end{cases}$$

Equation (10)

From equation (10) it will be seen that comparator outputs $U_1$, $U_2$, $U_3$ and $U_4$ will equal 1 when the phase angle $\phi$ assumes the value indicated below:

$$U_1 = 1 \text{ when } -3\pi/8 < \phi < 5\pi/8$$
$$U_2 = 1 \text{ when } -\pi/8 < \phi < 7\pi/8$$
$$U_3 = 1 \text{ when } +\pi/8 < \phi < 9\pi/8$$
$$U_4 = 1 \text{ when } +3\pi/8 < \phi < 11\pi/8$$

(11)

The values of $U_1-U_4$ are given in the truth table of FIG 5a for all values of bearing angle $\phi$. These outputs of the comparators together with their complements are combined in accordance with the table of FIG. 5a in AND gates 81–88. Only one of these AND gates will produce a true output, i.e. "1," corresponding to the sector within which the bearing angle to the source lies. For example, if the relative bearing from the craft to a source is 100° the condition of the comparator outputs will be $U_1$, $U_2$, $U_3$, $U_4$. The output of AND gate 83 will then be "1" while the output of the remainder of AND gates 81–88 will be "0." The outputs of gates 81–88 are connected to the inputs of individual 2-bit counters 91–98. Whenever a "1" output appears from an AND gate in synchronism with a clock pulse on line 99 from the timing circuits 44, the counter associated with that gate advances one count. Whenever any of the counters 91–98 reaches a full two count, a trigger pulse is passed to a monostable multivibrator 101–108 which becomes conductive illuminating one of the eight lamps of bearing indicator 42, depending on the bearing angle of the source. Once triggered the multivibrator 101–108 remain conductive a fixed period. A display period of one to three seconds has been found to be adequate. The timing circuits 44 also provide a reset pulse on line 111 for clearing all counters 91–98 before the beginning of an active PWI cycle. It will be appreciated that since the valid transponder reply signal includes at least the two framing pulses and probably will contain one or more information pulses, counters 91–98 afford protection against the generation of false alarms by single spurious noise pulses and against erroneous display of position if reply pulses from two or more transponders are received simultaneously.

Figure 6:
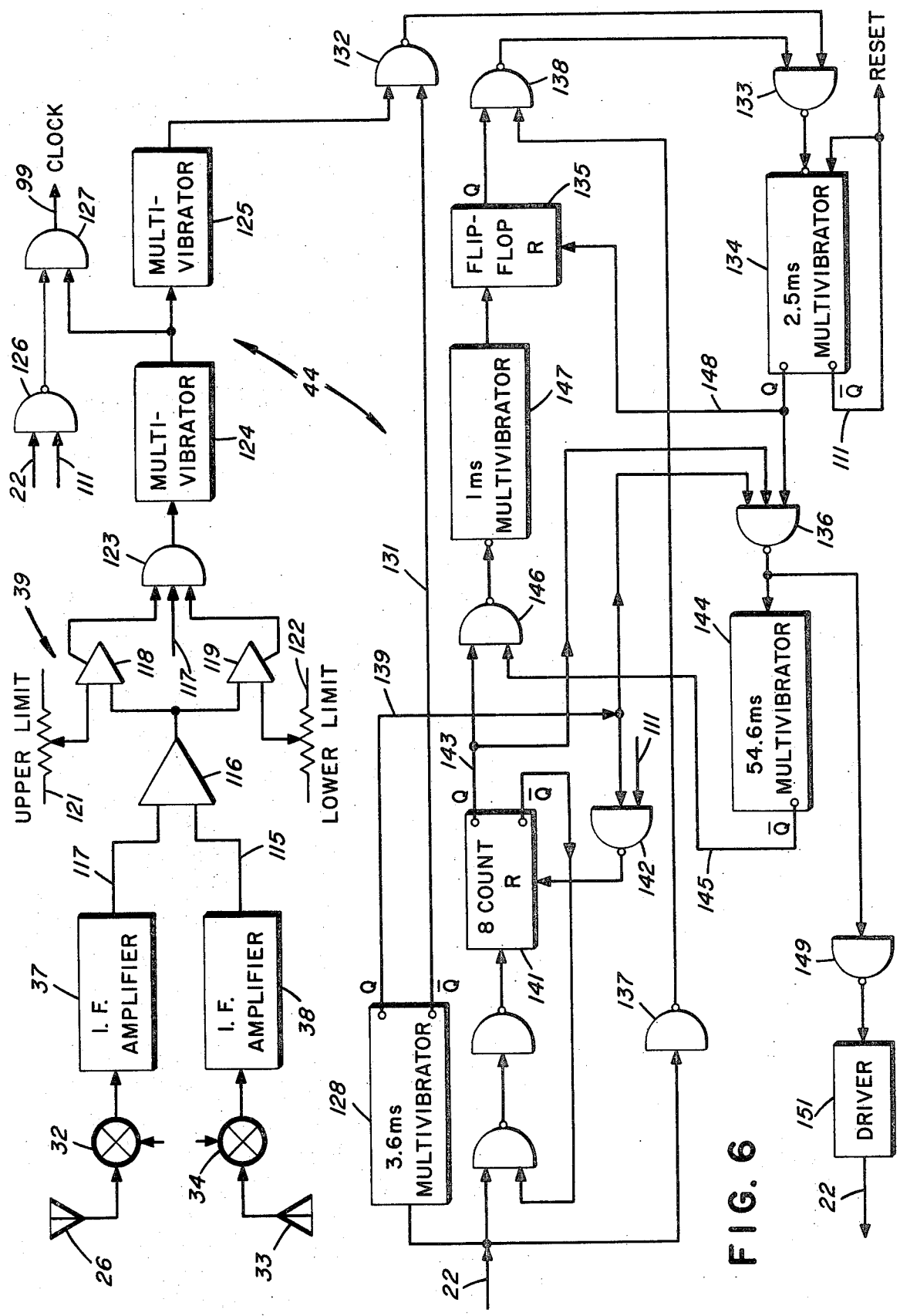
FIG. 6 is a functional block diagram of the elevation channel 39 and timing circuits 44 of FIG. 1.

The elevation channel 39 and timing circuits 44 appear in the block diagram of FIG. 6. The function of the elevation channel 39 is to reject indications of other aircraft located beyond certain upper and lower limits above and below the pitch plane of the PWI equipped craft. The function of the timing circuits 44 is, in the absence of interrogation signals from the ground, to periodically reset counters 91–98 so that the presentation of the indicator lights controlled by multivibrators 101–108 is current. If the aircraft is being interrogated, the timing circuits will interrupt replies to those interrogations periodically at intervals of about 55 milliseconds to permit the PWI to listen for a period of 2.5 milliseconds for reply signals from other aircraft. The timing circuits are further arranged to prevent such interruption until after a definite number of interrogation signals have been received and answered. Means are provided for reasonably insuring that those interrogation signals originate from the same ground radar. These functions are intended to cause the PWI to be active when the equipped craft is reasonably well within the beam of the interrogating radar and thus be able to detect aircraft on approximately the same radial from the ground radar as is the equipped craft. Obviously if the range between the equipped craft and other aircraft is small both will be nearly on this same radial, so that unless means are provided for quasisynchronizing the PWI with the interrogating radar, the closest and likely most hazardous of the other aircraft will not be detected.

Referring to FIG. 6, elevation channel 39 will first be described. Signal from lower antenna 33 appearing at the video output 115 of log IF amplifier 38 is one input to a differential amplifier 116, while the other input thereto is the video output 117 of log IF amplifier 37 from the upper reference antenna 26. The difference output from amplifier 116 is proportional to the difference in logarithms of the magnitudes of received signals or to the logarithm of their ratio and is independent of range attenuation and transmitted power. This output is compared with an upper voltage limit and with a lower voltage limit in comparators 118 and 119. The upper and lower voltage limits are set by adjustable potentiometers 121 and 122. Whenever the difference output of amplifier 116 is algebraically less than the upper limit and greater than the lower limit, the output of each comparator is a logical "1." If the difference is outside these limits one or the other of the comparators will produce a logical "0" output. The outputs of comparators 118 and 119 are combined in an AND gate 123 which will pass a trigger pulse to a timing multivibrator 124 only if the difference is between the upper and lower limits. Multivibrator 124 and a succeeding multivibrator 125 are provided for pulse shaping and pulse position adjustment to aid in compensating for circuit delays. Whenever the transponder aboard the aircraft receivs a valid interrogation signal it generates a suppression pulse which appears on line 22. Lines 22 and 111 from $\overline{Q}$ of a 2.5 millisecond multivibrator 134 are connected through NAND gate 126 as one input to an AND gate 127. The absence of a suppression pulse therefore enables gate 127 to pass pulses from multivibrator 124 to clock line 99, which will enable counters 91–98 of the bearing angle processor 41. Suppression pulse line 22 is also connected to trigger a 3.6 millisecond multivibrator 128. Absent a trigger, multivibrator 128 rests with its complementary output 131 in a logical "1" state. NAND gates 132 and 133 will then be enabled, as will later be explained, allowing a pulse from multivibrator 125 to pass through and trigger a 2.5 millisecond multivibrator 134.

Prior to triggering, multivibrator 134 produces a "1" output on complementary line 111. This output resets counters 91–98 of the bearing angle processor 41. When multivibrator 134 is triggered by a pulse from gate 133 its state changes for a period of 2.5 milliseconds to apply a "1" input to a NAND gate 136 and to cause line 111 to become "0." Absent a suppression pulse on line 22, the output of an inverter 137 connected thereto is "1." Flip-flop 135 is a memory device which serves in part to indicate that eight interrogation signals have been received since the last active PWI period. Assuming that the aircraft is not being interrogated, the output of flip-flop 135 is "0." Thus the two inputs to the NAND gate 138 are "0" and "1" causing the output thereof to be "1." When no suppression pulses are present on line 22 and no reply signals have been received from other aircraft, the inputs to NAND gate 132 are "0" from multivibrator 125 and "1" from multivibrator 128, causing the gate output to be "1." The inputs to gate 133 are then "1" and "1," resulting in a "0" output. When a reply signal is received from another aircraft within the limits established by elevation channel 39, multivibrator 125 will be triggered to the "1" state, consequently causing the gate 133 to trigger multivibrator 134, removing the reset from counters 91–98 and permitting the bearing angle processor 41 to operate.

At the end of 2.5 milliseconds, multivibrator 134 reverts to the condition causing reset of counters 91–98. If during that 2.5 millisecond period no interrogation signals are received, the next reply signal received from another aircraft and passing the elevation channel 39 simply retriggers multivibrator 134 to produce another active PWI detection period of 2.5 milliseconds.

The reception of a valid interrogation signal will be indicated by the appearance of a suppression pulse on line 22 which triggers multivibrator 128 for a period of 3.6 milliseconds to produce a "0" on line 131, thus inhibiting gate 132 and preventing PWI operation in the "no interrogation mode" previously discussed. The triggering of multivibrator 128 conditions the timing circuits for a count of interrogation signals for the purpose of synchronizing later change-over to a PWI active cycle so that change-over will occur only after the PWI euipped aircraft is reasonably well within the beam of the interrogation radar. This function of the timing circuits will now be described.

The suppression pulse appearing on line 22 triggers multivibrator 128 to produce a "1" on line 139. Prior to this time an eight-count counter 141 is held in a reset condition by an inverter 142 connected to line 139. Counter 141 is then enabled but the output thereof on line 143 remains in a "0" condition until eight interrogation signals have been counted. During this time multivibrator 134 cannot be retriggered by multivibrator 125 because gate 132 is inhibited. Initially the inputs to gate 136 are "0" from counter 141, "0" from multivibrator 134 and "1" from multivibrator 128. Gate 136 therefore is inhibited from triggering a 54.6 millisecond multivibrator 144 whose output Q̄ remains "1" until PWI has been active. The outputs of counter 141 and multivibrator 144 are combined in a NAND gate 146. Before triggering of multivibrator 144 and before accumulation of eight counts by counter 141, the output of gate 146 is "1." The output of gate 146 becomes "0" when counter 141 reaches the full eight count. A 1 millisecond multivibrator 147 is then triggered by the negative-going pulse from gate 146. One millisecond later flip-flop 135 is triggered. This causes the output of gate 138 to drop to "0" provided the transponder is not at the time replying to an interrogation. If a reply is in process, the output of gate 138 does not change until the reply is complete, then a trigger pulse will pass from gate 138 through gate 133 to multivibrator 134. The output of multivibrator 134 appearing on line 148 thereupon becomes "1" causing reset of flip-flop 135. The inputs to gate 136 then become "1" from counter 141, "1" from multivibrator 128 and "1" from multivibrator 134 thus causing the output of gate 136 to drop to "0." This output is inverted 149 and amplified in a driver 151 whch applies an output to suppression line 22 to prevent the generation of local transponder replies for the period of 2.5 milliseconds. At the expiration of this period, the output of gate 136 reverts to "1," triggering multivibrator 144 and enabling the local transponder to again reply to interrogation signals for (54.6 + 1) milliseconds after which the PWI cycle may be repeated for a 2.5 millisecond period.

The time constants for multivibrators 134 and 144 are selected in accordance with recommendations of RTCA Committees on Airborne ATC Transponders. Multivibrator 147 delays initiation of the 2.5 millisecond active PWI period so that replies can be detected from aircraft both closer to and farther away from the interrogating radar than is the equipped craft. The time constant of multivibrator 128 is slightly greater than the sum of the time constants of multivibrators 134 and 147 to prevent conflict between "interrogated" and "not interrogated" modes of PWI operation.

Typical characteristics for interrogators of the ATCRBS, which share the scan mechanism of the ATC primary radar are: a scan rate of 6 rpm, a beamwidth of 4° and an interrogation rate of 400 interrogations per second. With this scan rate and beamwidth an aircraft will be within the radar beam for about 111 milliseconds. The interval between interrogations is 2.5 milliseconds, causing the output of multivibrator 128 on line 139 to be continuously high during interrogation. After the accumulation of eight counts in counter 141 plus the 1 millisecond delay of multivibrator 147 the aircraft should be about 20% across the beam of the radar. The PWI becomes active at this time for a period of 2.5 milliseconds, possibly causing the loss of one interrogation and one reply. The PWI cannot again become active until the 54.6 millisecond period of multivibrator 144 has expired plus the 1 millisecond delay of multivibrator 147. The position of the aircraft should then be at about 70% of the interrogator beamwidth from the initial position. In other words, considering the aircraft to be stationary, the leading edge of the interrogator beam will have moved about 0.8 of a degree past the aircraft when the first active PWI period begins. The leading edge of the beam will have moved then about 2.8° past the aircraft when the second active PWI period begins. Thus the active PWI periods are synchronized with the interrogation in such a way as to give reasonable assurance that other aircraft located on approximately the same radial from the interrogator will be detected.

The invention claimed is:

1. A pilot warning indicator installed in a first aircraft for alerting the pilot thereof to the presence of other aircraft at substantially the altitude of said first aircraft and for indicating the relative bearing to such other aircraft, said other aircraft being equipped with transponders for replying to interrogation signals, comprising:

a receiver having first, second and third antenna means for receiving transponder reply signals from said other aircraft;

said third antenna means including an array of antennas and feed means therefor whereby signals from said third antenna means vary in phase according to the bearing of said other aircraft relative to said first aircraft;

means for combining signals from said first and second antenna means so as to accept and further process said reply signals from other aircraft located within a limited space above and below the pitch plane of said first aircraft and to reject said replay signals from other aircraft located outside said limited space;

means for comparing the phase of signals accepted by said combining means with corresponding signals received by said third antenna means to provide information of the bearing of said other aircraft within said limited space relative to said first aircraft; and, means for displaying said bearing information to the pilot thereby directing his attention to a region in space containing said other aircraft.

2. An indicator as claimed in claim 1 wherein said first and second antenna means have substantially equal sensitivity to signals from said other aircraft located on the pitch plane of said first aircraft at any relative bearing thereto and with the sensitivity to signals from said other aircraft located above the pitch plane of said first aircraft being greater for said first antenna means than said second antenna means and being greater for said second antenna means than said first antenna means to signals from said other aircraft located below said pitch plane.

3. An indicator as claimed in claim 2 wherein said combining means includes means for obtaining the difference between logarithms of signals from said first antenna means and said second antenna means; and means for rejecting said reply signals whenever said difference exceeds a predetermined limit.

4. An indicator as claimed in claim 1 wherein said phase comparing means includes means for delaying incrementally signals received by said first antenna means and said signals received by said third antenna means whereby the bearing of said other aircraft is determined by the relative amount of delay necessary to bring said delayed signals substantially into phase with one another.

5. An indicator as claimed in claim 4 wherein said incremental delay means comprises a delay line tapped along its length with signals from said first antenna means applied to one end of said delay line and with signals from said third antenna means applied to the opposite end of said delay line.

6. An indicator as claimed in claim 5 including means for comparing the amplitude of signals appearing at adjacent taps of said delay line to provide an output in logic form indicative of the bearing of said other aircraft and further including logic means for controlling said display means in accordance with said logic output.

7. A pilot warning indicator installed in a first aircraft equipped with a transponder for replying to interrogation signals for alerting the pilot thereof to the presence of other aircraft likewise equipped with transponders and for inidcating the relative bearing to such other aircraft, comprising first and second antenna means for receiving transponder reply signals from other aircraft, said first and second antenna means being of substantially equal sensitivity to reply signals from other aircraft located near the pitch plane of said first aircraft and at any relative bearing thereto, said first antenna means being of greater sensitivity to reply signals from other aircraft located above the pitch plane of said first aircraft than to reply signals from other aircraft located below the pitch plane of said first aircraft, the sensitivty of said second antenna means being oppositely directed to provide greater sensitivity to reply signals from other aircraft located below the pitch plane of said first aircraft;

means for comparing reply signals simultaneously received by said first and second antenna means for rejecting reply signals from other aircraft located substantially above or below the pitch plane of said first aircraft and for accepting for further processing reply signals from other aircraft located near to or on the pitch plane of said first aircraft and at any bearing relative to said first aircraft;

third antenna means for receiving reply signals from other aircraft and providing information in the form of signal phase of the bearing relative to said first aircraft of other aircraft from which said reply signals are received;

means for comparing the phase of signals from said third antenna means with signals from said first antenna means to extract said bearing information therefrom;

means for displaying said bearing information only as to other aircraft from which reply signals are accepted by said comparing means; and, means operative after reception of a fixed member of interrogation signals by the transponder on said first aircraft for preventing for a fixed period replies to valid interrogations by said transponder on said first aircraft whereby said indicator may receive and display reply signals from other aircraft during a time when said transponder on said first aircraft is being interrogated.

8. An indicator as claimed in claim 7 wherein said means for preventing replies for a fixed period includes means for counting interrogation signals received by the transponder on said first aircraft, said preventing means operating to prevent replies only after the accumulation of a fixed count by said counting means.

9. An indicator as claimed in claim 8, with additionally, means for introducing a fixed delay following accumulation of said fixed count before operation of said preventing means, the amount of said delay being of the order of one-half of the normal repetition period of interrogation signals.

10. An indicator as claimed in claim 9 wherein said third antenna means comprises a spiral-phase field array antenna.

11. An indicator as claimed in claim 10 wherein said array antenna comprises, an array of antenna elements;

feed means for said array; and phase shifters in said feed means for introducing a phase shift to each element of said array which progressively increases by a fixed amount for each successive element of said array.

12. An indicator as claimed in claim 11 wherein said phase comparing means comprises a tapped delay line with signals from said array antenna applied to one end thereof and signals from said first antenna means applied to the opposite end thereof, said phase comparing means further including means for comparing the amplitude of signals simultaneously appearing at adjacent taps of said delay line to provide outputs in the form of unique logic sets identifying sectors of relative bearing containing the other aircraft from which reply signals are received by said array antenna and said first antenna means.

13. An indicator as claimed in claim 12, with additionally, counting means interposed between said phase comparing means and said display means to inhibit display of bearing information until after a fixed number of coincident bearing information signals has been accumulated.

14. An indicator as claimed in claim 13 wherein said means for comparing reply signals received by said first and second antenna means controls said counting means so as to prevent accumulation of a count for a bearing information signal corresponding a reply signal rejected by said first and second antenna comparing means.

15. A pilot warning indicator installed in a first aircraft for alerting the pilot thereof to the presence and relative bearing of other aircraft flying at nearly the same altitude as the first aircraft, said first aircraft and said other aircraft being equipped with transponders for replying to interrogation signals, comprising first and second antennas for receiving transponder reply signals from other aircraft, said first and second antennas having substantially equal omnidirectional gain patterns on the pitch plane of said first aircraft, the gain patterns of said first and second antennas being greater, respectively, above and below the pitch plane of said first aircraft;

an antenna array for receiving transponder reply signals from other aircraft said array having spiral-phase field characteristics whereby the signal produced at the output thereof varies in phase with reference to the free field signal producing such output substantially directly according to the azimuth bearing of the source of such free field signal from said array;

a local oscillator;

means for mixing coherently signals from said first, second and array antennas with output from said local oscillator to produce three separate intermediate frequency signals;

means for obtaining the logarithms of said intermediate frequency signals originating at said first and second antennas;

means for obtaining the difference between said logarithms;

means for comparing the absolute value of said difference with a reference to produce an enabling signal whenever said absolute value is less than said reference;

means for comparing the phase of said intermediate frequency signal originating with said antenna array with the phase of one of said other intermediate frequency signals, said phase comparing means producing an output in digital form related to the bearing of the source of signals received by said first, second and array antennas; and means controlled by said enabling signal for visually displaying said digital output signals of said phase comparing means.

16. An indicator as claimed in claim 15 and wherein means are provided for preventing operation of said indicator whenever the transponder on said first aircraft replies to an interrogation signal and with additionally, means for counting the number of interrogation signals received by the transponder on said first aircraft; and means enabling for a fixed period said indicator and preventing reply to interrogation signals after a fixed number of interrogation signals received by the transponder on said first aircraft has been counted.

17. An indicator as claimed in claim 16 with additionally means for inhibiting operation of said indicator enabling means for a second fixed period whereby said indicator is operative only a fractional part of the time during which the transponder on said first aircraft may reply to interrogation signals.

18. An indicator as claimed in claim 16 wherein said phase comparing means comprises a tapped delay line having said intermediate frequency signal from said array applied to one end thereof and said other intermediate frequency signal applied to the other end thereof, voltage comparators for comparing the voltage between adjacent taps of said delay line and producing digital outputs indicative of the tap of said delay line having the greatest comparative output, and logic gates for assembling digital outputs from said comparators in order to produce a set of signals for actuating said visual display means.

19. An indicator as claimed in claim 18 wherein said visual display means comprises a plurality of signal lamps each disposed to indicate a particular bearing sector relative to said first aircraft, said lamps being actuable by signals from the set produced by said logic gates to become illuminated and identify the bearing sector containing the other aircraft from which reply signals are received.

20. An indicator as claimed in claim 19 with additionally means for counting each signal of said set of signals from said logic gates to prevent illumination of a signal lamp of said display until after a fixed number of signals for actuating that lamp have been counted.

* * * * *